US010949336B2

(12) United States Patent
Keynes et al.

(10) Patent No.: US 10,949,336 B2
(45) Date of Patent: Mar. 16, 2021

(54) PATH-SENSITIVE STATIC ANALYSIS

(71) Applicant: Oracle International Corporation, Redwood Shores, CA (US)

(72) Inventors: Nathan Robert Albert Keynes, Kuraby (AU); Eric Beguet, London (GB)

(73) Assignee: Oracle International Corporation, Redwood Shores, CA (US)

( * ) Notice: Subject to any disclaimer, the term of this patent is extended or adjusted under 35 U.S.C. 154(b) by 96 days.

(21) Appl. No.: 16/370,847

(22) Filed: Mar. 29, 2019

(65) Prior Publication Data

US 2020/0310951 A1  Oct. 1, 2020

(51) Int. Cl.
 *G06F 11/00* (2006.01)
 *G06F 11/36* (2006.01)
(52) U.S. Cl.
 CPC ...... *G06F 11/3688* (2013.01); *G06F 11/3604* (2013.01); *G06F 11/3664* (2013.01); *G06F 11/3684* (2013.01); *G06F 11/3692* (2013.01)
(58) Field of Classification Search
 CPC ............. G06F 11/3604; G06F 11/3664; G06F 11/3692; G06F 11/3624; G06F 11/3684; G06F 11/3672; G06F 11/36; G06F 11/362
 See application file for complete search history.

(56) References Cited

U.S. PATENT DOCUMENTS

| 9,798,540 | B1* | 10/2017 | Helie | G06F 8/42 |
| 2010/0333069 | A1* | 12/2010 | Chandra | G06F 8/75 |
| | | | | 717/126 |
| 2018/0293160 | A1* | 10/2018 | van Schaik | G06F 11/3692 |

OTHER PUBLICATIONS

Magnus Madsen et al., "From Datalog to Flix: A Declarative Language for Fixed Points on Lattices"; Proceedings of the 37th ACM SIG—Plan Conference on Programming Language Design and Implementation; New York, New York; pp. 194-208; Jun. 13-17, 2016 (15 pages).
Jeff Smits et al., "FlowSpec: Declarative Dataflow Analysis Specification"; Proceedings of the 10th ACM SIGPLAN International Conference on Software Language Engineering; Vancouver, Canada; pp. 221-231; Oct. 23-24, 2017 (11 pages).
Foto Afrati et al., "From CTL to Datalog"; Proceedings of the Paris C. Kanellakis Memorial Workshop on Principles of Computing & Knowledge; San Diego, California; pp. 72-85; Jun. 8, 2003 (14 pages).

* cited by examiner

*Primary Examiner* — Charles Ehne
(74) *Attorney, Agent, or Firm* — Ferguson Braswell Fraser Kubasta PC

(57) ABSTRACT

A method may include obtaining, from one of the rules of a static analysis, a built-in path relation describing a path constraint on a path variable, generating, using the rules, a transfer function that updates a property vector while analyzing code, generating an evaluation function that determines, using the updated property vector, whether the static analysis is satisfied, and determining whether the code includes a defect by executing the static analysis on the code using the path constraint, the transfer function, and the evaluation function.

19 Claims, 6 Drawing Sheets

PATH-SENSITIVE STATIC ANALYSIS

BACKGROUND

Static analyses have typically been written as explicit imperative programs, or using some form of logical query language, such as Datalog. Imperative programs provide high performance at the cost of developer time to create and maintain, while logical query languages provide compact, rapid development at a substantial cost to performance. Path-sensitivity, where the analysis utilizes the branch conditions of a path, is critical to the precision of many practical static analyses, such as detection of memory leaks and use-after-free defects.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including obtaining, from one of the rules of a static analysis, a built-in path relation describing a path constraint on a path variable, generating, using the rules, a transfer function that updates a property vector while analyzing code, generating an evaluation function that determines, using the updated property vector, whether the static analysis is satisfied, and determining whether the code includes a defect by executing the static analysis on the code using the path constraint, the transfer function, and the evaluation function.

In general, in one aspect, one or more embodiments relate to a system including a memory coupled to a computer processor, a repository configured to store code, a property vector, and a static analysis including rules, and a code analyzer, executing on the computer processor and using the memory, configured to generate, using the rules, a transfer function that updates the property vector while analyzing the code, and generate an evaluation function that determines, using the updated property vector, whether the static analysis is satisfied. The system further includes a dataflow engine, executing on the computer processor and using the memory, configured to determine whether the code includes a defect by executing the static analysis on the code using the path constraint, the transfer function, and the evaluation function.

In general, in one aspect, one or more embodiments relate to a non-transitory computer readable medium including instructions that, when executed by a computer processor, perform: obtaining, from one of the rules of a static analysis, a built-in path relation describing a path constraint on a path variable, generating, using the rules, a transfer function that updates a property vector while analyzing code, generating an evaluation function that determines, using the updated property vector, whether the static analysis is satisfied, and determining whether the code includes a defect by executing the static analysis on the code using the path constraint, the transfer function, and the evaluation function.

Other aspects of the invention will be apparent from the following description and the appended claims.

DETAILED DESCRIPTION

Figure 1A:
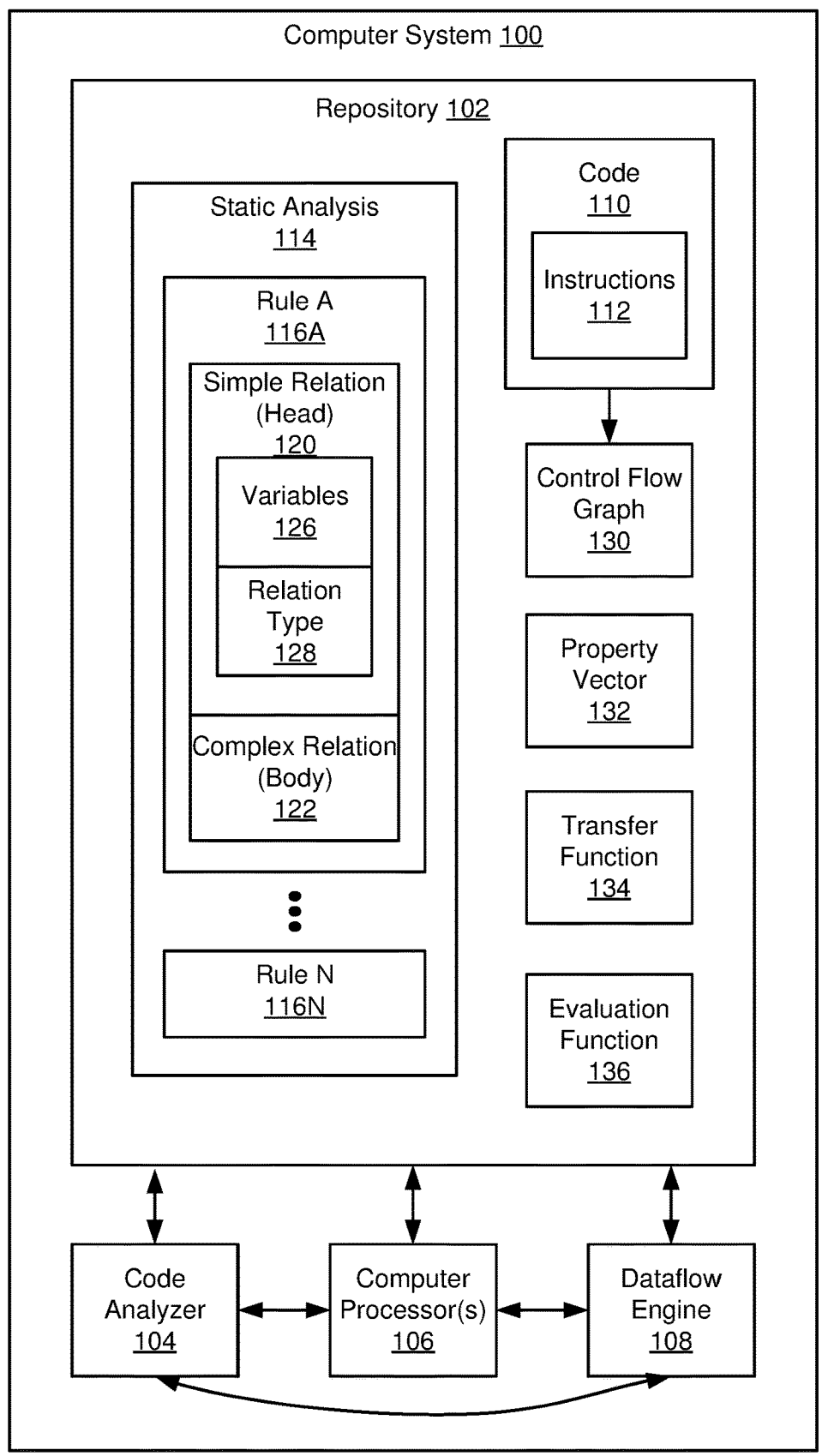
FIG. 1A and FIG. 1B show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to path-sensitive static analysis. In one or more embodiments, a static analysis is expressed declaratively, exploiting explicit linguistic (e.g., compiler) support for path constraints. The path constraints may specify which instructions to include in a path, ordering constraints applied to the instructions in the path and/or path conditions applied to branch conditions in the code to be analyzed. A transfer function may be generated to update a property vector as each instruction in the code is analyzed. In one or more embodiments, the transfer function includes imperative instructions that generate, access and/or modify the property vector based on properties observed in the code during the static analysis. The properties may correspond to the results of the static analysis, including whether specific instructions and/or correlated values have been observed during the static analysis. An evaluation function may be generated to determine, using the property vector, paths in the code satisfying the goal of the static analysis. For example, the goal of the static analysis may be to identify paths in the code corresponding to defects, such as memory leaks.

FIG. 1A shows a computer system (100) in accordance with one or more embodiments of the invention. As shown in FIG. 1A, the computer system (100) includes a repository (102), a code analyzer (104), one or more computer processors (106), and a dataflow engine (108). In one or more embodiments, the computer system (100) takes the form of the computing system (500) described with respect to FIG. 5A and the accompanying description below or takes the form of the client device (526) described with respect to FIG. 5B. In one or more embodiments, the computer processor(s) (106) takes the form of the computer processor(s) (502) described with respect to FIG. 5A and the accompanying description below.

In one or more embodiments, the repository (102) may be any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site.

In one or more embodiments, the repository (102) includes code (110), a static analysis (114), a control flow graph (130), a property vector (132), a transfer function (134), and an evaluation function (136). In one or more embodiments, the code (110) is a collection of source code. The code (110) may include instructions (112) written in a programming language, or intermediate representation (e.g., byte code).

In one or more embodiments, the static analysis (114) defines a goal expressed as a pattern. For example, the pattern may be a pattern of instructions (112) that corresponds to a defect. For example, the defect may be a memory leak, where a region of memory (e.g., the non-persistent storage (504) or the persistent storage (506) of FIG. 5A) is not freed after the region has been allocated. Alternatively, the defect may be a "use after free" defect, where a region of memory is used after the region has been freed. In one or more embodiments, the static analysis (114) is represented as a declarative program that specifies goals without expressing a sequence of instructions (i.e., a control flow) to accomplish the goals. Said another way, a declarative program (e.g., in contrast to a procedural or imperative program) may be a program in which the logic of a computation is expressed without describing its control flow. A declarative program may be expressed in a logic programming language (e.g., Datalog or Prolog).

In one or more embodiments, the static analysis (114) includes rules (116A, 116N). In one or more embodiments, the static analysis (114) is satisfied when one or more of the rules (116A, 116N) are satisfied (e.g., triggered). Each rule (116A) may represent a logical implication such that a simple relation (120) in the head of the rule (e.g., the relation to the left of the implication symbol) is true when a complex relation (122) in the body of the rule (e.g., an expression to the right of the implication symbol) is true. A simple relation (120) may express facts as one or more tuples. A simple relation (120) may include variables (126) and a relation type (128). Each of the variables (126) may be represented by a symbol (e.g., 'x', 'y', 'input', 'result').

For example, a path-sensitive static analysis to detect memory leaks may be expressed as the following relation and rule, which may be read as "AllocLeakPaths( ) are those paths containing a malloc instruction that is not followed by a free instruction that frees the allocated value":

AllocLeakPaths(P: Path, M: MallocInstruction, F: FreeInstruction)

AllocLeakPaths(P)→PathInstruction(P,M), MallocInstruction(M,V), !(PathBefore(P,M,F), FreeInstruction(F,V))

Figure 1B:
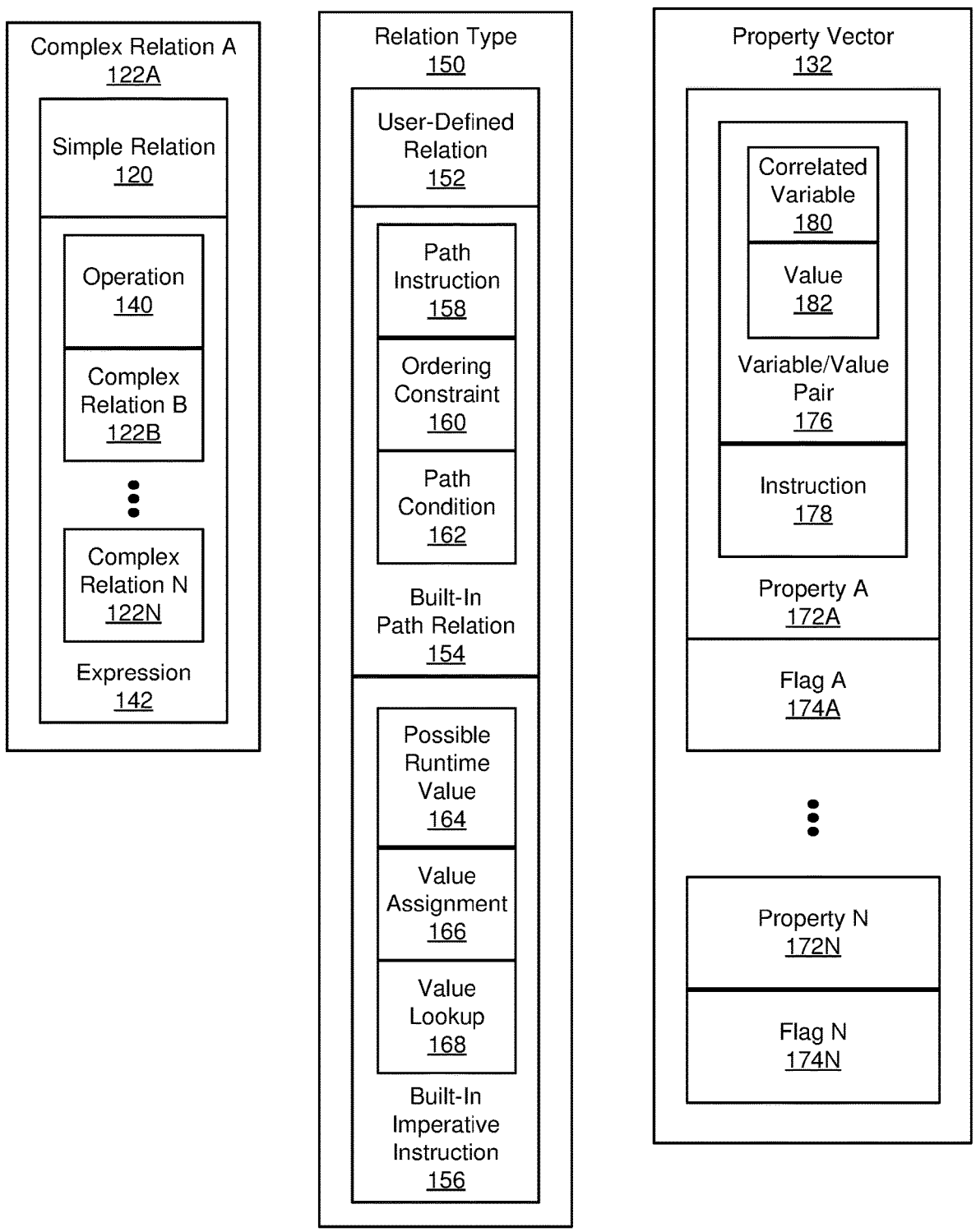

Turning to FIG. 1B, in one or more embodiments, a complex relation (122A) may be a simple relation (120). Alternatively, a complex relation (122A) may be an expression (142) that includes an operation (140) applied to one or more complex relations (122A, 122N). That is, a complex relation (122A) may be a recursive structure such that the complex relation (122A) may be an expression that includes other complex relations, which in turn may be expressions, etc. The operator (140) may be a logical operator (e.g., "and", "or", "not", etc.).

Turning to FIG. 1B, in one or more embodiments, the relation type (150) may be user-defined relation (152), built-in path relation (154), or built-in imperative instruction (156). A user-defined relation (152) may be a declarative relation (e.g., a relation as is commonly represented in a purely declarative language such as Datalog). For example, a user-defined relation (152) may be a complex relation (122A).

The relation types built-in path relation (154) and built-in imperative instruction (156) represent extensions to the conventional logic programming framework. In one or more embodiments, a built-in path relation (154) specifies a path constraint that may be used in a path-sensitive static analysis. For example, the path constraint may be an ordering constraint (160) or a path condition (162) applied to a variable that represents a path. The path may be an execution path that includes a series of instructions (112) in the code (110). In one or more embodiments, a built-in path relation (154) alerts the dataflow engine (108) to the presence of a path constraint, for example, so that the dataflow engine (108) may apply specific, path-sensitive processing to the path constraint.

In one or more embodiments, a built-in path relation (154) specifies a path instruction (158) indicating that an instruction is to be included in a path. For example, PathInstruction (P,X) and PathInstruction(P,Y) indicates that instructions X and Y are included in path P.

In one or more embodiments, the path instruction (158) may further indicate a value. For example, PathPHI(P, PHINode,value) may indicate that an instruction in path P is a phi node that selects a value from multiple incoming instructions. Continuing this example, each incoming instruction may correspond to an edge in a control flow graph (130) generated for the code (110). Explicitly representing phi nodes may be useful when the code (110) is represented in single static assignment (SSA) form. In one or more embodiments, using SSA, variables are renamed such that each variable is assigned exactly once, and each variable is defined before it is used. For example, if it is possible to assign a variable x using a value coming from multiple instructions (e.g., due to conditional branches), then the variable x may be split into versions that are named $x_1$, $x_2, \ldots x_n$ to correspond with the various ways that x may be assigned a single value (i.e., exactly once). In this way each assignment of the variable x corresponds to its own version $x_i$. In one or more embodiments, requiring that each variable represented be assigned exactly once simplifies the traversal of the control graph (130) when tracing the flow of values among instructions (112), since there is a unique execution path through the control graph (130) corresponding to each variable assignment.

In one or more embodiments, a built-in path relation (154) specifies an ordering constraint (160) indicating that one instruction precedes another instruction in a path. For example, PathBefore(P,I,J) indicates that instruction I precedes instruction J in path P. In one or more embodiments, a built-in path relation (154) specifies a path condition (162) indicating a condition to be satisfied by a path. The condition may be a logical predicate. For example, PathCondition(P, Cond) may require that the condition Cond be true in path P (e.g., relative to branch conditions in the code (110) applicable to path P).

Returning to FIG. 1A, in one or more embodiments, the property vector (132) represents properties observed during the execution of the static analysis (114) on the code (110). Returning to FIG. 1B, the property vector (132) may include properties (172A, 172N) and flags (174A, 174N). In one or more embodiments, a property (172A) is a variable/value pair (176) that includes a correlated variable (180) and a value (182). The correlated variable (180) may be a variable that is included in multiple relations (e.g., multiple user-defined relations (152)), referred to as correlated relations. That is, the value of the correlated variable (180) in one correlated relation may be correlated to the value of the correlated variable (180) in one or more other correlated relations. For example, given the correlated relations LoadInstruction(L,V) and StoreInstruction(S,_,V), the variable V is a correlated variable, where the underline "_" is a "don't care" placeholder variable that represents the stored value. Continuing this example, the property vector (132) may include a property that is a variable/value pair corresponding to each load instruction that operates on the correlated variable V. Similarly, the property vector (132) may include a property that is a variable/value pair corresponding to each store instruction that operates on the correlated variable V. In one or more embodiments, an index is associated with each property (172A) of the property vector (132).

In one or more embodiments, a property (172A) is an instruction (178). In one or more embodiments, the instruction (178) is an independent instruction referenced in a path instruction (158). The independent instruction may be an instruction in a user-defined relation that does not include a correlated variable. For example, instruction I is referenced in both the path instruction PathInstruction(P,I) and the user-defined relation TestInstruction(I), which does not include a correlated variable.

In one or more embodiments, a flag (174A) indicates the value of a predicate relative to the corresponding property (172A). For example, a flag (174A) may indicate whether the corresponding property (172A) has been observed during the execution of the static analysis (114) on the code (110). Continuing this example, a flag (174A) may indicate whether a value Y of correlated variable X (i.e., a variable/value pair (176)) has been observed during the execution of the static analysis (120). Alternatively, a flag (174A) may indicate whether an instruction (178) has been observed during the execution of the static analysis (114).

Returning to FIG. 1B, in one or more embodiments, a built-in imperative instruction (156) specifies how properties (172A, 172N) in the property vector (132) are generated, accessed and/or modified. The built-in imperative instruction (156) may be implemented using instructions in an imperative programming language (e.g., C, Java, etc.). In one or more embodiments, a built-in imperative instruction (156) adds a possible runtime value (164) of a variable. For example, the variable may correspond to different values at different program points (e.g., at different instructions (112)) in the code (110). In one or more embodiments, the runtime value is added to an array of values corresponding to the variable. For example, the runtime value may be added to the array at a specific index of the array (e.g., where the index is calculated using an auto-incrementing counter). In one or more embodiments, the variable is a correlated variable included in multiple relations (122A, 122N).

In one or more embodiments, a built-in imperative instruction (156) specifies a value assignment (166) for a property (172A). For example, the value assignment (166) may set the value of the flag (174A) corresponding to the property (172A). In one or more embodiments, a built-in imperative instruction (156) specifies a value lookup (168) for a property (172A). For example, the value lookup (168) may read the value of the flag (174A) corresponding to the property (172A). Alternatively, the value lookup (168) may obtain the index at which a possible runtime value of a variable is stored in an array of runtime values (e.g., where another built-in imperative instruction (156) had previously added the possible runtime value to the array).

Returning to FIG. 1A, in one or more embodiments, the transfer function (134) updates the property vector (132) based on analyzing the instructions (112) in the code (110). In one or more embodiments, the transfer function (134) augments the static analysis (120) with built-in imperative instructions (156).

In one or more embodiments, the evaluation function (136) evaluates the result of executing the static analysis (114) on the code (110). For example, the evaluation function (136) may determine whether the code (110) includes a defect based on the state of the property vector (132).

In one or more embodiments, the control flow graph (130) represents the paths that may be traversed while executing the code (110). Each path may correspond to a sequence of instructions (112) of the code (110).

In one or more embodiments, the code analyzer (104) may be implemented in hardware (e.g., circuitry), software, firmware, and/or any combination thereof. The code analyzer (104) may be implemented as part of a compiler. In one or more embodiments, the code analyzer (104) includes functionality to generate a property vector (132), a transfer function (134) and/or an evaluation function (136) for a static analysis (114). The code analyzer (104) may include functionality to generate a control flow graph (130) for the code.

In one or more embodiments, the dataflow engine (108) may be implemented in hardware (e.g., circuitry), software, firmware, and/or any combination thereof. In one or more embodiments, the dataflow engine (108) includes functionality to execute a static analysis (114). The code analyzer (104) may include functionality to execute a path-sensitive static analysis (114) by applying path constraints corresponding to the static analysis (114). The code analyzer (104) may include functionality to process built-in path relations (154) and built-in imperative instructions (156) corresponding to the static analysis (114).

In one or more embodiments, the computer processor (106) includes functionality to execute the code (110). In one or more embodiments, the computer processor (106) includes functionality to execute the code analyzer (104) and/or the input generator (108).

While FIG. 1A shows a configuration of components, other configurations may be used without departing from the scope of the invention. For example, various components may be combined to create a single component. As another example, the functionality performed by a single component may be performed by two or more components.

Figure 2:
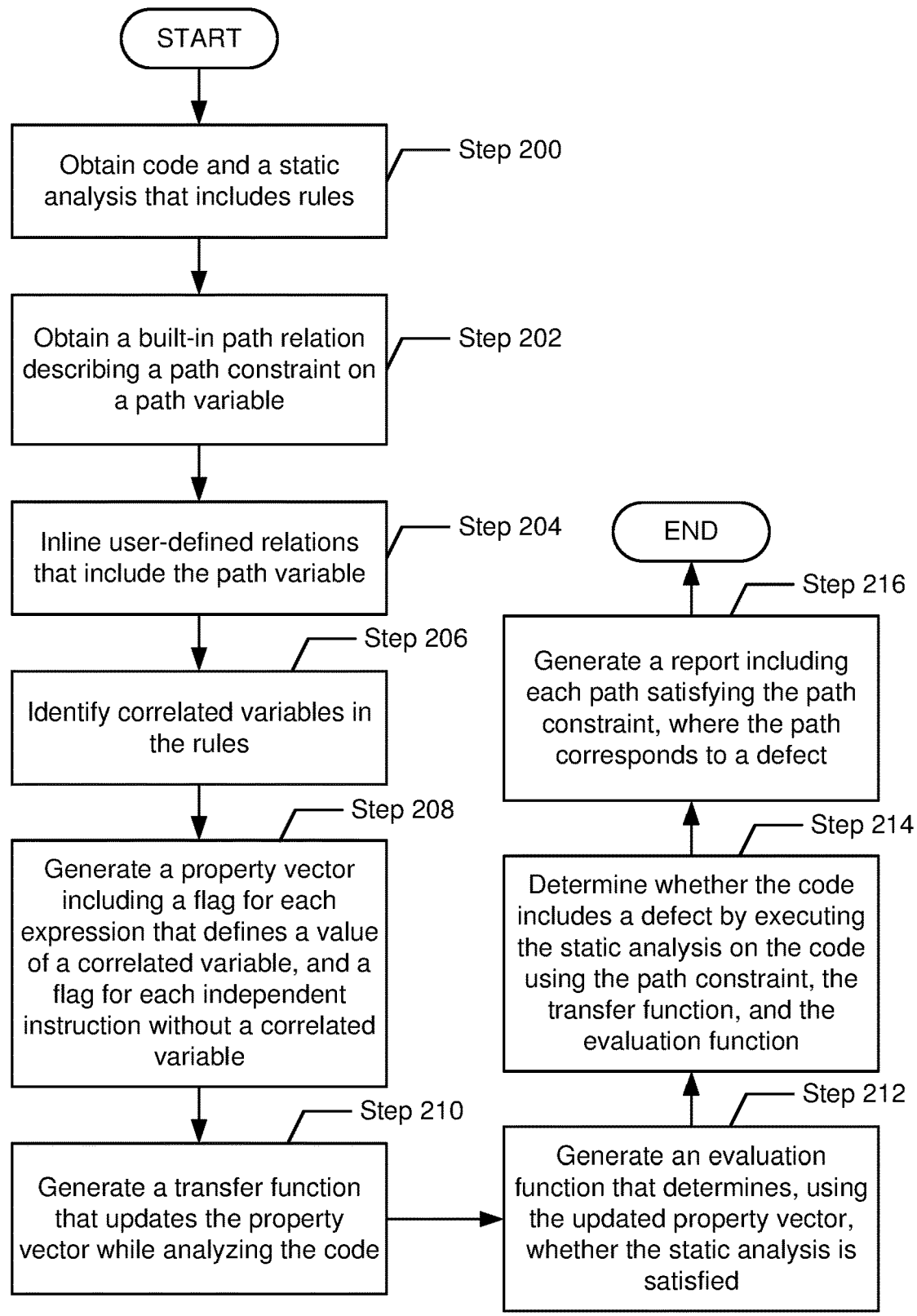
FIG. 2 shows a flowchart in accordance with one or more embodiments of the invention.

FIG. 2 shows a flowchart in accordance with one or more embodiments of the invention. The flowchart depicts a process for path-sensitive static analysis. One or more of the steps in FIG. 2 may be performed by the components (e.g., the code analyzer (104) and/or dataflow engine (108) of the computer system (100)), discussed above in reference to FIG. 1A. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 200, code and a static analysis are obtained. For example, code analyzer may obtain the code and the static analysis from a repository.

In Step 202, a built-in relation describing a path constraint on a path variable is obtained. In one or more embodiments, the built-in path relation is included in a rule (e.g., the body of a rule) of the static analysis. In one or more embodiments, the code analyzer determines that a variable P is a path variable due to the inclusion of P in a built-in path relation, for example: PathInstruction(P,I) or PathBefore(P,I,J).

In Step 204, one or more user-defined relations including the path variable are inlined. For example, a user-defined relation may appear in the head of a rule, and the code analyzer may inline the user-defined relation by replacing the user-defined relation with the body of the rule. Continuing this example, the body of the rule may include a built-in path relation describing a path constraint on the path variable.

In one or more embodiments, the code analyzer inlines user-defined relations until each relation in the body of a rule that includes a path variable is a built-in path relation. In other words, the code analyzer may inline user-defined relations until no user-defined relation in the body of a rule includes a path variable. Limiting path variables to built-in path relations may enable the dataflow engine (e.g., in Step 214 below) to identify which variables are path variables, thus enabling the dataflow engine to apply path constraints (e.g., path conditions and ordering constraints) to path variables. Thus, the dataflow engine may process paths as first-class objects in order to perform a path-sensitive analysis.

In one or more embodiments, the code analyzer combines the relations that include the path variable into a single relation that represents the disjunction of the relations. In one or more embodiments, the code analyzer converts recursive rules into iterative rules prior to inlining.

In Step 206, correlated variables in the relations are identified. For example, the code analyzer may identify correlated variables as any variable that is included in more than one user-defined relation.

In Step 208, a property vector is generated by creating a flag for each property. In one or more embodiments, the property is a variable/value pair that includes a possible runtime value of a correlated variable. In one or more embodiments, the property is an independent path instruction without a correlated variable. In one or more embodiments, the flag indicates whether the corresponding property has been observed during the static analysis of the code.

In one or more embodiments, the code analyzer generates the possible runtime values for the correlated variable to provide an array of values upon which the static analysis may operate (e.g., in Step 214 below). In one or more embodiments, the code analyzer generates the possible runtime values of the correlated variable using one or more built-in imperative instructions. For example, the built-in imperative instruction may add a value to an array of values for the correlated variable.

The code analyzer may use a correlated relation to generate the possible runtime values. For example, the code analyzer may use either LoadInstruction(L,V) or StoreInstruction(S,_,V) to generate the possible runtime values of V. Continuing this example, the possible runtime values of V are the pointers used to load and store a value. Thus, the code analyzer may examine the code to find either all instances of load instructions or all instances of store instructions to generate the possible runtime values of V. In one or more embodiments, the code analyzer selects a correlated relation based on a prioritization of the correlated relations that include the correlated variable. For example, the prioritization may be based on the expected cost to generate the possible runtime values using each correlated relation. Continuing this example, the code analyzer may select StoreInstruction(S,_,V) to generate the possible runtime values based on determining that the code includes fewer store instructions than load instructions. The property vector may include a flag for each load instruction that operates on the correlated variable V, and a flag for each store instruction that operates on the correlated variable V.

In one or more embodiments, when there are multiple correlated variables, the code analyzer attempts to select a minimal set of correlated variables from which the remaining correlated variables may be derived.

In one or more embodiments, the code analyzer unifies built-in path relations that can be merged relative to a single, independent path instruction. For example, PathInstruction (P,I), PathBefore(P,I,S), can be reduced to simply PathBefore(P,I,S).

In one or more embodiments, the dataflow engine generates the property vector incrementally as the static analysis is executed on the code. For example, observed runtime values may be mapped (e.g., added) to an array of runtime values as the runtime values are encountered while executing the static analysis. However, generating the array of runtime values and the property vector in advance may be more efficient in practice.

In Step 210, a transfer function is generated that updates the property vector while analyzing code. In one or more embodiments, the code analyzer generates the transfer function by combining the rules of the static analysis with one or more imperative instructions that access and/or modify the property vector. The dataflow engine may use the transfer function (e.g., in Step 214 below) to update the flags of property vector as the dataflow engine executes the static analysis on each statement of the code.

In one or more embodiments, each imperative instruction assigns a value to a flag corresponding to a property in the property vector. For example, the imperative instruction may set the value of the flag corresponding to a variable/value pair (V,W) in the property vector. Continuing this example, the dataflow engine may, while using the transfer function to execute the static analysis on the code in Step 214 below, set the value of the flag for the variable/value pair (V,W) to "true" when the dataflow engine observes the value W of the variable V. Alternatively, the dataflow engine may set the value of the flag for an independent path instruction to "true" when the dataflow engine observes the independent path instruction.

In one or more embodiments, the transfer function sets the value of the flag for one property based on the value of another flag for another property. For example, an ordering constraint specified in the static analysis may require that a free instruction follow a malloc instruction. Continuing this example, the flag for the free instruction may be set to the value of the flag for the malloc instruction. That is, if the flag for the malloc instruction has a value of false (i.e., the malloc instruction has not been observed), then when the free instruction is observed, the flag for the free instruction should also have a value of false. And if the flag for the malloc instruction has a value of true (i.e., the malloc instruction has already been observed), then when the free instruction is observed, the flag for the free instruction should also have a value of true.

In one or more embodiments, the transfer function combines (e.g., disjoins) the path conditions specified in the static analysis to form an overall path condition. The overall path condition may be evaluated by the dataflow engine in Step 214 below relative to branch conditions of the code.

In Step 212, an evaluation function is generated that determines, using the updated property vector, whether the static analysis is satisfied. In one or more embodiments, the evaluation function accesses the updated property vector via one or more value lookup imperative instructions. In one or more embodiments, the value lookup imperative instructions may lookup the values of flags corresponding to properties generated and/or set by imperative instructions used in the transfer function. The evaluation function may be a logical expression (e.g., a conjunction) of the values of the flags corresponding to the properties. When the logical expression evaluates to "true", then the path being analyzed (e.g., in Step 214 below) has satisfied the goal defined by the static analysis. For example, if the static analysis detects defects (e.g., memory leaks), then the path being analyzed corresponds to a defect.

In Step 214, the static analysis is executed on the code to determine, using the path constraint, the transfer function, and the evaluation function, whether the code includes a defect. In one or more embodiments, the dataflow engine executes the static analysis on the code by applying the transfer function to instructions in various paths through the code. In one or more embodiments, the dataflow engine excludes paths whose branch conditions fail to satisfy the path constraints specified in the built-in path relations (e.g., ordering constraints and/or path conditions) specified by the static analysis. Avoiding the exploration of paths failing to satisfy the path constraints enables the dataflow engine to perform the static analysis efficiently, on par with hand-tuned C++ code implementing comparable analyses. In addition, the declarative representation of the static analysis is approximately 10% of the size of the hand-tuned code implementing comparable analyses.

After executing the transfer function to obtain an updated property vector corresponding to a path being explored, the dataflow engine may apply the evaluation function to the updated property vector to determine whether the path satisfies the static analysis.

In Step 216, a report is generated that includes each path satisfying the path constraint from Step 204 above, where the path correspond to a defect. In one or more embodiments, the path corresponds to the value of a path variable included in the path instructions of the static analysis. In one or more embodiments, the instructions in the code corresponding to the path may be obtained by collecting the instructions referenced in built-in path instructions that include the path variable corresponding to the path. The report may include the values of each correlated variable referenced by the instructions in the path.

Figure 3:
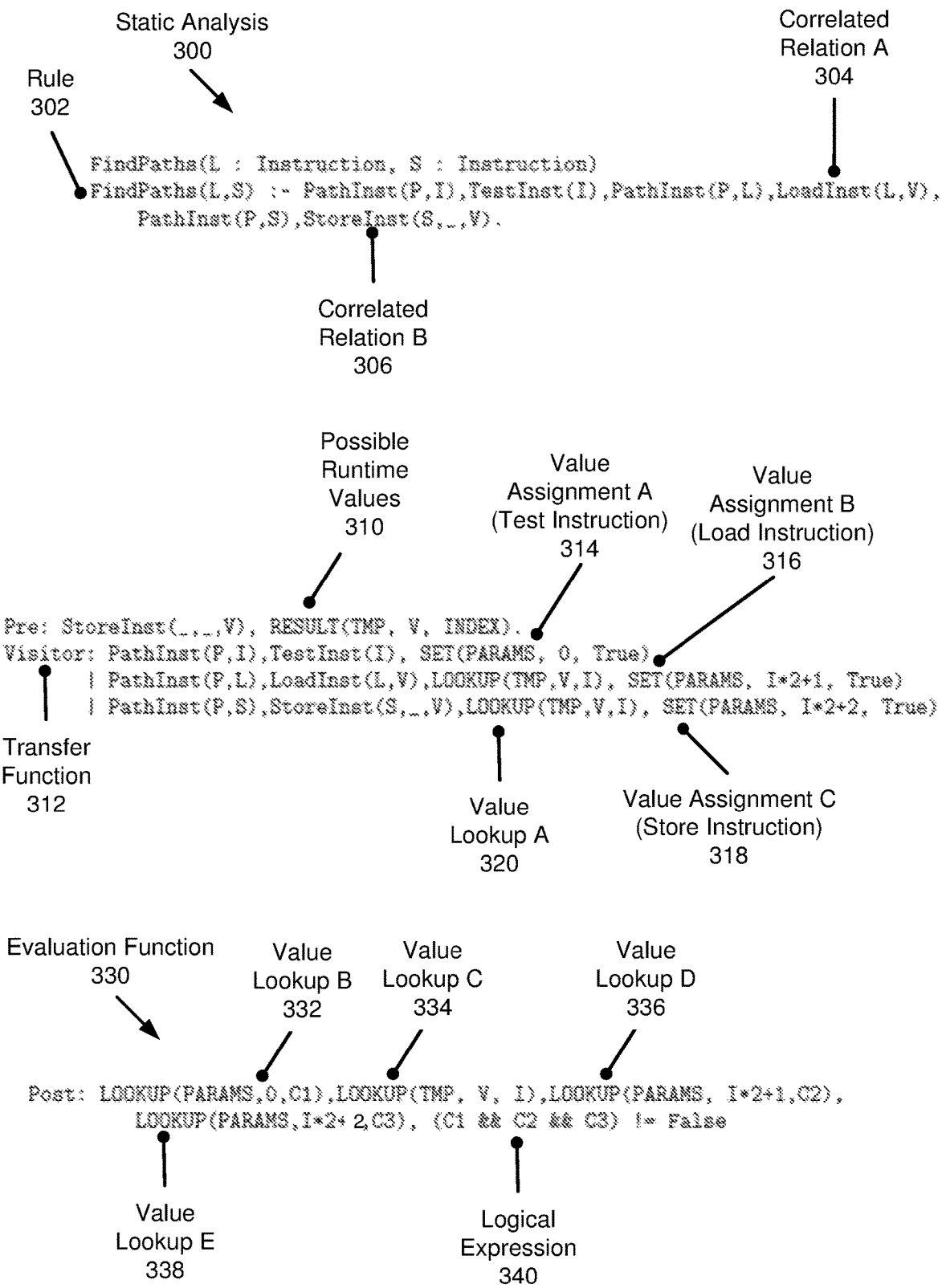
FIG. 3 and FIG. 4 show examples in accordance with one or more embodiments of the invention.
Figure 4:
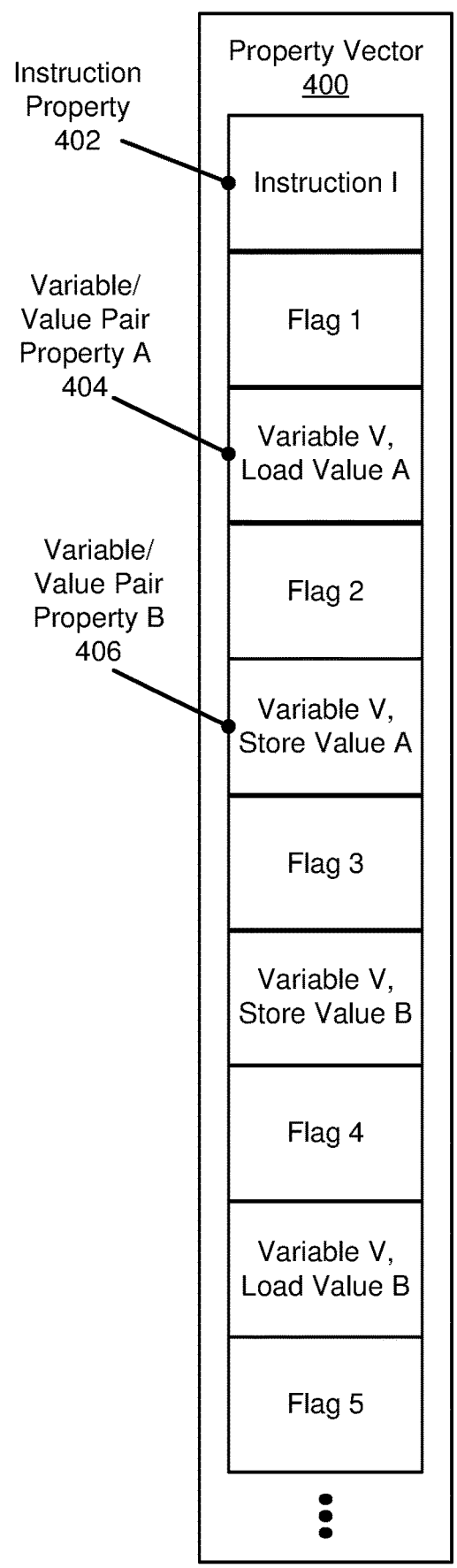

The following example is for explanatory purposes only and not intended to limit the scope of the invention. FIG. 3 and FIG. 4 show implementation examples in accordance with one or more embodiments of the invention. FIG. 3 shows a static analysis (300) ((114) in FIG. 1A) which includes a rule (302) ((116A) in FIG. 1A) that includes correlated relations (304, 306) that include a correlated variable V. Variable V is a pointer variable that is used by load and store instructions. Correlated relation A (304) matches load instructions that include the variable V, and correlated relation B (306) matches store instructions that include the variable V. The goal of the static analysis (300) is to identify paths that include an instruction matching the TestInst(I) relation and include at least one pair of correlated load and store instructions that include the same pointer value of the correlated variable V. The instruction I is an independent instruction that does not include a correlated variable.

Turning to FIG. 4, the code analyzer ((104) in FIG. 1A) generates a property vector (400) ((132) in FIG. 1A and FIG. 1B) from the static analysis (300). The property vector (400) is implemented by the PARAMS array. The property vector (400) includes an array of flags each associated with a property, where the flag indicates whether the corresponding property has been observed when executing the static analysis (300) on code ((110) in FIG. 1A). Each property is either an instruction, or a variable/value pair corresponding to a correlated variable. The code analyzer uses the StoreInst(_, _,V) relation to generate the variable/value pair properties corresponding to the correlated variable V. The code analyzer generates the variable/value pairs using the possible runtime values (310) ((164) in FIG. 1B) imperative instruction, which adds, to the TMP array, each possible runtime value of variable V used in a store instruction.

FIG. 4 illustrates that the instruction property (402) corresponds to the instruction I included in the TestInst(I) relation of the static analysis (300). FIG. 4 also illustrates that variable/value pair property A (404) corresponds to the correlated variable V and the pointer value A of variable V used in a load instruction. In addition, variable/value pair property B (406) corresponds to the correlated variable V and the pointer value A of variable V used in a store instruction.

Returning to FIG. 3, the code analyzer next generates a transfer function (312) ((134) in FIG. 1A) from the static analysis (300). The transfer function (312) updates the flags of the property vector (400) as the static analysis (300) is executed on the code to be analyzed. FIG. 3 shows that the transfer function (312) includes built-in imperative instructions corresponding to the user-defined relations of the static analysis (300). For example, the transfer function (312) includes value assignment A (314) ((166) in FIG. 1B) which sets the flag for the instruction property (402) corresponding to instruction I when instruction I is observed in path P during the analysis of the code. Value assignment A (314) indicates that the flag corresponding to instruction I is located at index 0 in the PARAMS array that implements the property vector (400).

Similarly, value assignment B (316) sets the flag for variable/value pair property A (404) corresponding to the correlated variable V and the pointer value A used when a load instruction referencing the pointer value A is observed in path P during the analysis of the code. Value assignment B (316) indicates that the flag corresponding to the load instruction is located at index I*2+1 in the property vector (400) (i.e., the PARAMS array). In addition, value assignment C (318) sets the flag for variable/value pair property B (406) corresponding to the correlated variable V and the pointer value A used when a store instruction referencing the pointer value A is observed in path P during the analysis of the code. Value assignment C (318) indicates that the flag corresponding to the store instruction is located at index I*2+2 in the property vector (400). A similar procedure is used to update the flags of the property vector (400) corresponding to additional load and store instructions referencing the correlated variable V using a correlated pointer value. Value lookup A (320) ((168) in FIG. 1B) is used to obtain the value of index I, which is an index into the TMP array of runtime values of the correlated variable V. As described above, the index I is used in both value assignment B (316) and value assignment C (318).

The code analyzer next generates the evaluation function (330) ((136) in FIG. 1A) from the static analysis (300). The evaluation function (330) determines, using the property vector (400), whether the code satisfies the goal of the static analysis (300), as expressed by the rule (302). That is, the evaluation function (330) determines whether the code includes a path that includes a TestInst instruction and at least one pair of correlated load and store instructions that include the same value of the correlated variable V. The code analyzer generates the evaluation function (330) by combining the flags corresponding to the relevant properties of the property vector (400). That is, the evaluation function (330) combines the flags that were set by the transfer function (312) during the analysis of the code. In this case, the flags are combined via a logical expression (340) that combines the flags via a logical "and", in accordance with the rule (302) of the static analysis (300). The code analyzer generates the evaluation function by generating value lookup imperative instructions to access the flags in the property vector (400). For example, the evaluation function (330) includes value lookup B (332) that reads, into variable C1, the flag for the instruction property (402) in the property vector (400) (e.g., stored in the PARAMS array at index 0) that indicates whether instruction I was observed during the analysis of the code.

Similarly, value lookup D (336) reads, into variable C2, the flag for variable/value pair property A (404) in the property vector (400) (e.g., stored in the PARAMS array at index I*2+1) that indicates whether a load instruction referencing the pointer value A was observed during the analysis of the code. Value lookup C (334) is used to obtain the index I into the TMP array of runtime values corresponding to the pointer value of the correlated variable V. Value lookup E (338) reads, into variable C3, the flag for variable/value pair property B (406) in the property vector (400) (e.g., stored in the PARAMS array at index I*2+2) that indicates whether a store instruction referencing the pointer value A was observed during the analysis of the code. Finally, the evaluation function (330) calculates the logical expression (340) that combines variables C1, C2, and C3 to determine whether the goal of the static analysis (300) is satisfied.

Once the code analyzer has generated the property vector (400), the transfer function (312), and the evaluation function (330), the dataflow engine ((108) in FIG. 1A) then executes the static analysis (300) on the code. First, the dataflow engine performs the static analysis (300) on the code using the transfer function (312) to update the property vector (400). Next, the dataflow engine applies the evaluation function (330) to determine whether the updated property vector (400) satisfies the goal of the static analysis (300). The dataflow engine issues a report indicating whether a path exists satisfying the goal of the static analysis (300). If one or more paths satisfying the goal exist, then the dataflow engine includes at least one (e.g., shortest) of the satisfying paths in the report. For example, the dataflow engine may generate the instructions in a path by collecting all instructions included in a built-in path relation that includes the path variable corresponding to the path.

Figure 5A:
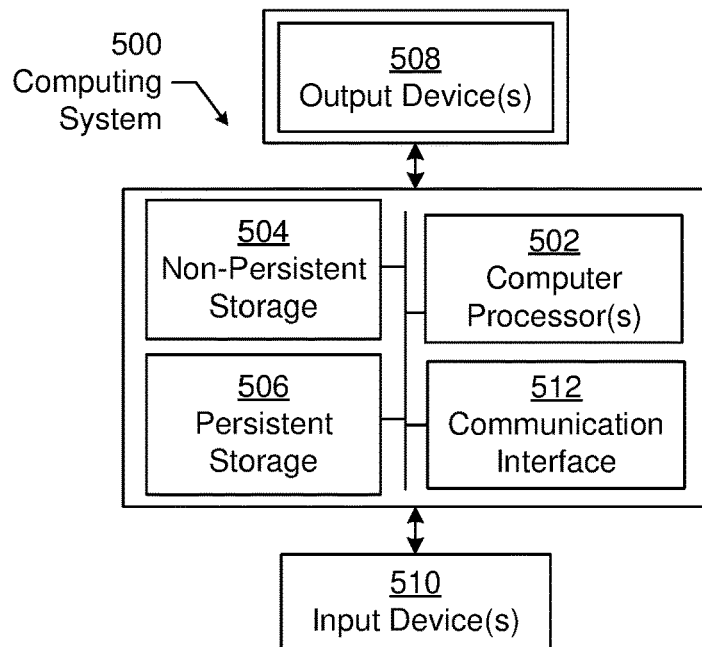
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
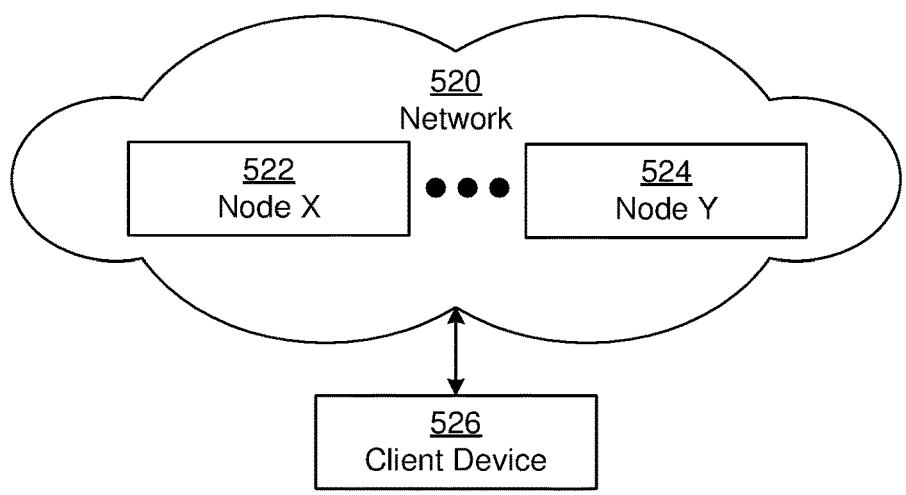

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
   obtaining, from a rule of a plurality of rules of a static analysis, a built-in path relation describing a path constraint on a path variable, wherein the built-in path relation comprises a path condition;
   generating, using the plurality of rules, a transfer function that updates a property vector while analyzing code;
   generating an evaluation function that determines, using the updated property vector, whether the static analysis is satisfied; and
   determining whether the code comprises a defect by executing the static analysis on the code using the path constraint, the transfer function, and the evaluation function, wherein executing the static analysis comprises determining whether a branch condition of the code satisfies the path condition.

2. The method of claim 1, further comprising:
   generating a report comprising a path satisfying the path constraint, wherein the path comprises a series of instructions in the code, and wherein the path corresponds to the defect.

3. The method of claim 1, further comprising:
generating an imperative instruction that updates the property vector, wherein the transfer function comprises the imperative instruction.

4. The method of claim 1, further comprising:
inlining one or more user-defined relations comprising the path variable until each relation comprising the path variable is a built-in path relation, wherein the relation is in a body of a rule of the plurality of rules.

5. A system, comprising:
a memory coupled to a computer processor;
a repository configured to store code, a property vector, and a static analysis comprising a plurality of rules;
a code analyzer, executing on the computer processor and using the memory, configured to:
obtain, from a rule of the plurality of rules, a built-in path relation describing a path constraint on a path variable, wherein the built-in path relation comprises a path condition,
generate, using the plurality of rules, a transfer function that updates the property vector while analyzing the code, and
generate an evaluation function that determines, using the updated property vector, whether the static analysis is satisfied; and
a dataflow engine, executing on the computer processor and using the memory, configured to determine whether the code comprises a defect by executing the static analysis on the code using the path constraint, the transfer function, and the evaluation function, wherein executing the static analysis comprises determining whether a branch condition of the code satisfies the path condition.

6. The system of claim 5, wherein the code analyzer is further configured to:
generate a report comprising a path satisfying the path constraint, wherein the path comprises a series of instructions in the code, and wherein the path corresponds to the defect.

7. The system of claim 5, wherein the code analyzer is further configured to:
generate an imperative instruction that updates the property vector, wherein the transfer function comprises the imperative instruction.

8. A non-transitory computer readable medium comprising instructions that, when executed by a computer processor, perform:
obtaining, from a rule of a plurality of rules of a static analysis, a built-in path relation describing a path constraint on a path variable, wherein the built-in path relation comprises a path condition;
generating, using the plurality of rules, a transfer function that updates a property vector while analyzing code;
generating an evaluation function that determines, using the updated property vector, whether the static analysis is satisfied; and
determining whether the code comprises a defect by executing the static analysis on the code using the path constraint, the transfer function, and the evaluation function, wherein executing the static analysis comprises determining whether a branch condition of the code satisfies the path condition.

9. The non-transitory computer readable medium of claim 8, further comprising instructions that perform:
generating a report comprising a path satisfying the path constraint, wherein the path comprises a series of instructions in the code, and wherein the path corresponds to the defect.

10. The non-transitory computer readable medium of claim 8, further comprising instructions that perform:
generating an imperative instruction that updates the property vector, wherein the transfer function comprises the imperative instruction.

11. A method, comprising:
obtaining, from a rule of a plurality of rules of a static analysis, a built-in path relation describing a path constraint on a path variable;
identifying a correlated variable comprised by a subset of the plurality of rules;
generating a property vector by creating a flag for an expression that defines a value of the correlated variable;
generating, using the plurality of rules, a transfer function that updates the property vector while analyzing code;
generating an evaluation function that determines, using the updated property vector, whether the static analysis is satisfied; and
determining whether the code comprises a defect by executing the static analysis on the code using the path constraint, the transfer function, and the evaluation function.

12. The method of claim 11, further comprising:
prioritizing the subset, wherein the property vector is generated, based on the prioritizing, using a rule in the subset.

13. The method of claim 11, wherein the property vector is further generated by creating a flag for an independent instruction.

14. A system, comprising:
a memory coupled to a computer processor;
a repository configured to store code, a property vector, and a static analysis comprising a plurality of rules;
a code analyzer, executing on the computer processor and using the memory, configured to:
obtain, from a rule of the plurality of rules, a built-in path relation describing a path constraint on a path variable,
identify a correlated variable comprised by a subset of the plurality of rules,
generate a property vector by creating a flag for an expression that defines a value of the correlated variable,
generate, using the plurality of rules, a transfer function that updates the property vector while analyzing the code, and
generate an evaluation function that determines, using the updated property vector, whether the static analysis is satisfied; and
a dataflow engine, executing on the computer processor and using the memory, configured to determine whether the code comprises a defect by executing the static analysis on the code using the path constraint, the transfer function, and the evaluation function.

15. The system of claim 14, wherein the code analyzer is further configured to:
prioritize the subset, wherein the property vector is generated, based on the prioritizing, using a rule in the subset.

16. The system of claim 14, wherein the property vector is further generated by creating a flag for an independent instruction.

17. A non-transitory computer readable medium comprising instructions that, when executed by a computer processor, perform:
- obtaining, from a rule of a plurality of rules of a static analysis, a built-in path relation describing a path constraint on a path variable;
- identifying a correlated variable comprised by a subset of the plurality of rules;
- generating a property vector by creating a flag for an expression that defines a value of the correlated variable;
- generating, using the plurality of rules, a transfer function that updates the property vector while analyzing code;
- generating an evaluation function that determines, using the updated property vector, whether the static analysis is satisfied; and
- determining whether the code comprises a defect by executing the static analysis on the code using the path constraint, the transfer function, and the evaluation function.

18. The non-transitory computer readable medium of claim 17, further comprising instructions that perform:
- prioritizing the subset, wherein the property vector is generated, based on the prioritizing, using a rule in the subset.

19. The non-transitory computer readable medium of claim 17, wherein the property vector is further generated by creating a flag for an independent instruction.

* * * * *